Feb. 16, 1954  F. W. BROWN  2,669,033
MOVING TARGET GENERATING DEVICE
Filed Nov. 19, 1952
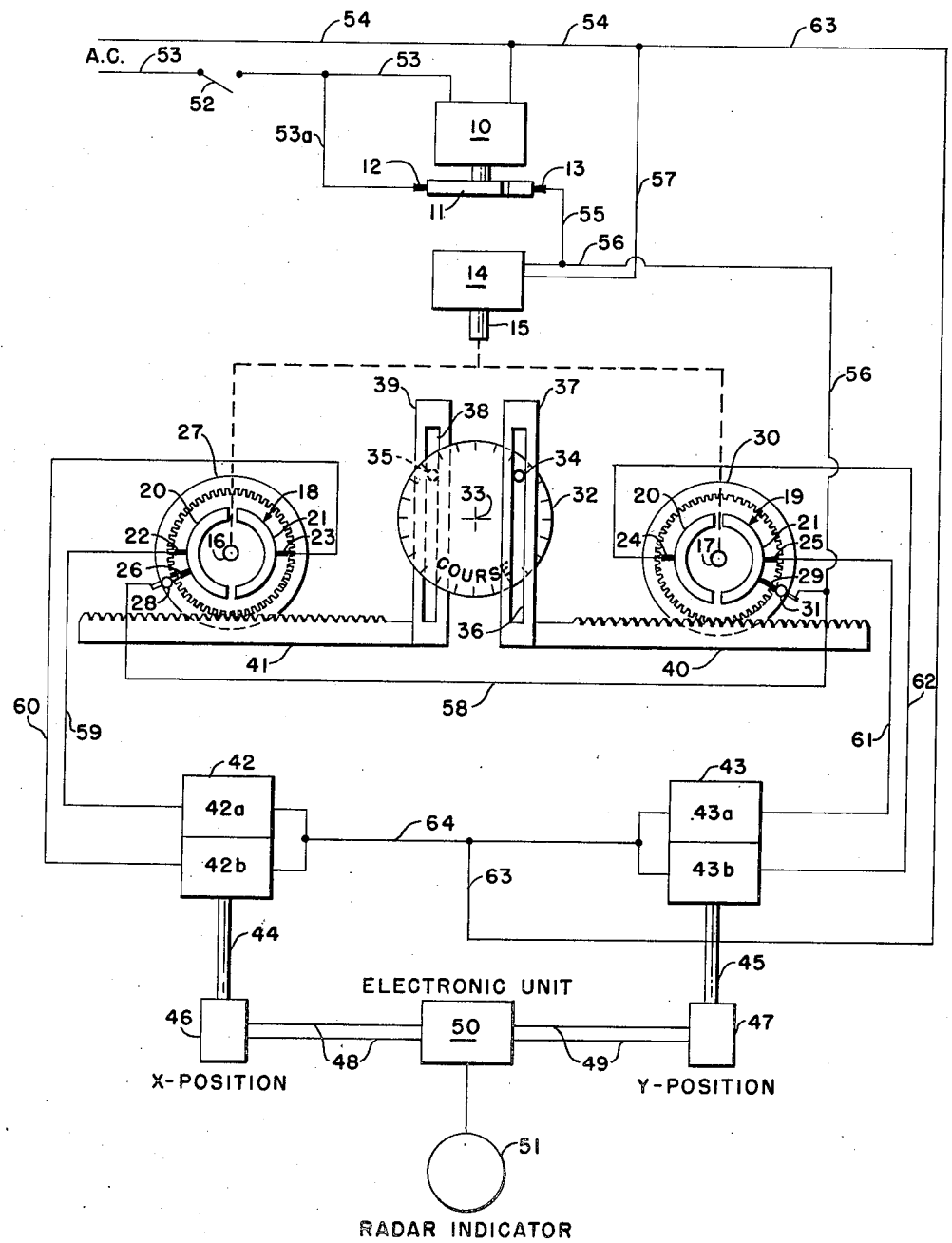
*INVENTOR.*
FORREST W. BROWN
BY Ervin B. Steinberg
AGENT Patented Feb. 16, 1954

2,669,033

UNITED STATES PATENT OFFICE 2,669,033

MOVING TARGET GENERATING DEVICE

Forrest W. Brown, New Canaan, Conn., assignor to The Reflectone Corporation, Stamford, Conn., a corporation of Connecticut Application November 19, 1952, Serial No. 321,487

6 Claims. (Cl. 35—10.4)

This invention relates to analog computing devices and synthetic training simulating equipment and has particular reference to target course generators which generate and simulate the motion of a radar target such as the motion of an aircraft or a ship for reproduction on radar indicating equipment.

The motion of an aircraft, ship or other movable object is identified by the characteristics of speed and course. Generally, these characteristics can be represented by a vector the length of which represents the speed and the orientation of which with respect to a Cartesian coordinate system, represents the course of a moving target. The problem presented therefore concerns the method of resolving an input motion into two mutually normal resultant vector motions representing the sine and cosine functions of the input.

The prior art discloses several methods by which this can be achieved. Several of the machines presently employed require the use of intricate mechanical integrators and differentials which are rather expensive, cumbersome and which are burdened with a great deal of mechanical precision. Devices of this type are rather unwieldy and demand a great deal of skill not only in the manufacture but also during operation and maintenance in the field.

The present device uses a minimum of mechanical elements and employs far less complicated components, namely switches and motors which are simple to operate and to maintain.

One of the objects of this invention is to provide an improved target generating device which avoids complicated mechanical devices.

Another object of this invention is to provide a simplified arrangement using a plurality of motors operating at a substantially constant speed together with inexpensive switching means.

Another object of this invention is to provide an arrangement which can be assembled and maintained with a minimum of precision and skill.

Another object of this invention is to provide a radar target course generating device in which the resultant outputs of the input vector appear as incremental movements of bidirectional motors.

The invention comprises a moving target generating device in which a repetitive intermittent switching means is coupled to a first driving means. A second driving means is controlled by said intermittent switching means and drives also a first and a second double circuit switching means. A first bidirectional driving means is controlled by said first double circuit switching means and a second bidirectional driving means is controlled by said second double circuit switching means. Means are provided to adjust the switching of the first double circuit switching means with respect to the second double circuit switching means.

With reference to the accompanying drawing, a substantially constant speed motor 10 such as a clock motor drives a commutator 11. A stationary brush 12 and an adjustable brush 13 coact with commutator 11 to provide intermittent closing and opening of an electrical circuit supplying energy to a second constant speed motor 14. A shaft 15 of motor 14 drives a suitable gear train (not shown) which in turn drives shafts 16 and 17. A commutator 18 is secured to shaft 16 and a commutator 19 is secured to shaft 17. These commutators including commutator 11 mentioned above comprise two segments 20 and 21 which are mounted in a manner insulated from one another. Coacting with commutator 18 are two stationary brushes 22 and 23 disposed about the circumference of the commutator in a position 180 degrees apart. In a similar manner two stationary brushes 24 and 25 are mounted 180 degrees apart on commutator 19. An adjustable brush 26 fastened to gear 27 by pin 28 may be positioned about the circumference of commutator 18 and in analogous fashion an adjustable brush 29 fastened to gear 30 by pin 31 may be positioned about the circumference of commutator 19. Gears 27 and 30 are concentric with shafts 16 and 17 respectively but are rotatable independently of the commutators. They serve as brush rigging for the adjustable brushes 26 and 29 respectively.

A wheel 32 rotatable about axis 33 has mounted on its face two pins 34 and 35 which are 90 degrees angularly disposed with respect to one another. This wheel 32 may be supported for rotation by means of three wheels engaging its periphery. Pin 34 is confined in the slot 36 of a slotted bar 37 and pin 35 is confined for sliding movement in slot 38 of slotted bar 39. Bar 37 is connected to rack 40 which engages gear 30. Bar 39 is connected to rack 41 which engages gear 27. When rotating wheel 32 about its center 33, pins 34 and 35 will move up and down in slots 36 and 38 respectively. This motion is transferred to racks 40 and 41 respectively which position adjustable brushes 26 and 29 respectively about the circumference of the commutators 18 and 19 respectively. This mechanism comprising a wheel, two pins 90 degrees spaced, slotted bars and racks, shown here in a schematic fashion, is commonly referred to as a "Scotch-yoke" mechanism and belongs to the class of sine-cosine resolving mechanism. Moving for instance pin 34 to the uppermost position, adjustable brush 29 fastened to gear 30 by virtue of pin 31 will move to the bottom center position of commutator assembly 19. At the time when this occurs, pin 35 will occupy a position 90 degrees from pin 34, being located on the left side of the horizontal axis of wheel 32, 90 degrees from pin 34, thereby causing adjustable brush 26 to be located in superposed relation with stationary brush 22. It will be seen therefore that the adjustable brushes are being positioned always 90 degrees with respect to one another, each brush moving through an 180 degree arc on the respective commutator. The adjustable brush position is determined by the 90 degrees spaced apart pins which are always in a sine-cosine relationship which results that the adjustable brushes are also in a sine-cosine relationship with respect to one another along their 180 degrees excursion.

Numerals 42 and 43 represent bidirectional motors, each motor having two selectively energizable field coils 42a and 42b, 43a and 43b respectively, the energizing of which determines the direction of rotation of motor shafts 44 and 45 respectively. Motor shaft 44 is coupled to a translating means 46 which translates mechanical shaft rotation to an electrical signal, as for instance a multi-turn potentiometer. In a similar manner shaft 45 is coupled to a corresponding translating means 47. Both translating means via conductors 48 and 49 are connected to an electronic unit 50 which converts the electrical signals received to proper information for suitable representation on a radar indicator 51.

The operation of this device may be visualized as follows:

Upon closing switch 52 motor 10 becomes energized from a source of alternating current via conductors 53 and 54 which will cause the motor to turn at substantially constant speed. At the same time that the switch 52 is closed the source of electrical energy is also applied to motor 14 via conductors 54 and 57, and via conductor 53a, stationary brush 12, commutator 11, adjustable brush 13, conductors 55 and 56. It will be recalled that commutator 11 comprises two segments mounted insulated from one another and it will be observed therefore that when bringing adjustable brush 13 in superposed relation with stationary brush 12, motor 14 will be energized the entire time except for the time that the insulation passes, while when moving adjustable brush 13 away from stationary brush 12, motor 14 will be energized for shorter and shorter intervals with zero speed taking place when brush 13 is displaced 180 degrees with respect to brush 12. The motor 14 therefore will operate intermittently with the ratio of energizing and deenergizing, this ratio commonly called "duty cycle," being determined by the position of adjustable brush 13. Hence the rotation of shaft 15 of motor 14 when integrated with respect to time may be considered a quantity proportional to the speed vector $ds/dt$ of the target which is to be simulated.

Motor shaft 15 as described above will rotate commutators 18 and 19 so that these commutators operate at a speed proportional to the speed vector of the target which is to be simulated. One terminal each of the motor coils 42a, 42b, 43a, and 43b is connected together by means of conductor 64. This conductor, via conductors 63 and 54, is connected to one side of the power supply. Coil 42a is connected via conductor 59 to stationary brush 22 whereas coil 42b is connected via conductor 60 to the opposed stationary brush 23. In a similar manner stationary brush 24 of commutator 19 is connected via conductor 62 to coil 43b and stationary brush 25 via conductor 61 to coil 43a. The adjustable brushes 26 and 29 are interconnected by means of conductor 58 which is joined to conductor 56 and is energized from commutator 11 via conductor 55.

When the wheel 32, which at the same time serves as course adjusting mechanism, is set in the position shown, it will be apparent that motor coil 42a is energized by virtue of brushes 22, 26 and the commutator segment. In a similar manner the commutator segment of commutator 19 causes motor coil 43a to be energized. As the commutators 18 and 19 rotate in synchronism driven by motor shaft 15, coils 42a and 43a are energized first, followed by motor coils 42b and 43b. Because of the location of the adjustable brushes about the commutator periphery the energizing of each motor coil is unequal with respect to time thus causing an incremental rotation of shafts 44 and 45 respectively.

When rotating pin 34 to its uppermost position as explained before, adjustable brush 29 of commutator 19 moves to the lowermost position thereby causing stationary brushes 24 and 25 to become energized for equal amounts of time resulting in zero integrated rotation of shaft 45 because the forward and reverse rotations of motor 43 are equal.

In this particular position of brush 29, pin 35 is rotated counter-clockwise to the horizontal plane through center 33 thereby causing brush 26 to become superposed on brush 22. This position in turn causes almost continuous energizing of motor coil 42a which is connected to brush 22. It is apparent therefore that the "course" wheel 32 in the position as shown in the figure will represent a 45 degree target course whereas in the latter position motion is along a single axis representing a course at one of the cardinal points of the compass. In such a manner the input speed vector is resolved in two outputs, the instantaneous X- and Y-positions respectively which represent the mutually normal components of the input vector.

The incremental motion of shaft 44 which is transmitted to a translating device 46 may be called the X-position of a moving target whereas the incremental motion of shaft 45 coupled to translating device 47 may be considered the Y-position. It is obvious that the X- and Y-position nomenclature may be reversed which will amount to a reorientation of the compass axes. The electronic unit transforms the signals received from translating devices 46 and 47 to proper pulse shape for representation on the conventional radar indicator identified by numeral 51.

Commutators 18 and 19 together with associated brushes constitute double circuit switching means energizing sequentially two separate circuits to cause the incremental shaft rotation of the motors as described. It is obvious that by rotating wheel 32 the course of the target to be simulated is changed inasmuch as that there will be a change of the resultant integrated incremental motions of shafts 44 and 45 with respect to one another.

Commutators 18 and 19 are driven from motor 14 at the rate determined by the position of brushes 12 and 13 on the commutator 11. As it is important that motors 42 and 43 not only follow this intermittent cycling but since it must be assured also that each bidirectional motor after having been stopped and re-energized completes the cycle already started, because otherwise an error would be added to the new resultant incremental motion, adjustable brushes 26 and 29 are connected in series with the intermittent cycling caused by commutator 11. Still further, it is apparent that motors 42 and 43 must operate with equal speed in either direction of rotation as merely the time and not the speed of rotation is varied by the brush arrangement about commutator 18 and 19. Although various types of motors may be used, it has been found that small size reversible clock motors give satisfactory results.

While there have been described and illustrated specific embodiments of the invention, it will be obvious that various changes and modifications may be made therein without departing from the field of the invention which should be limited only by the scope of the appended claims.

What is claimed is:

1. A moving target generating device comprising a first driving means, a repetitive intermittent switching means coupled to said driving means, a second driving means controlled by said intermittent switching means, said second driving means coupled to a first and to a second double circuit switching means, a first bidirectional driving means controlled by said first double circuit switching means and a second bidirectional driving means controlled by said second double circuit switching means and means to control the circuit switching of said first double circuit switching means with respect to said second double circuit switching means.

2. A moving target generating device comprising a first driving means, a cyclically operating intermittent switching means having a variable duty cycle driven by said first driving means, a second driving means controlled by said intermittent switching means, a first and a second double circuit switching means driven by said second driving means, a first and a second bidirectional driving means controlled by said first and by said second double circuit switching means respectively and means acting upon said pair of double circuit switching means to influence the rotational direction of said first bidirectional driving means with respect to second bidirectional driving means.

3. A moving target generating device comprising a first motor operating at a substantially constant speed, an intermittent switching means having an adjustable duty cycle driven by said first motor, a second constant speed motor intermittently energized by said intermittent switching means, a first and a second double circuit switching means driven by said second motor, each of said double circuit switching means adapted to sequentially energize two circuits, a first and a second bidirectional motor controlled by said first and said second double circuit switching means respectively and connected thereto to become sequentially energized for motion in forward and reverse direction and means acting upon said pair of double circuit switching means for influencing the time of forward and reverse directional operation of said first and of said second bidirectional motor with respect to one another.

4. A moving target generating device comprising a first motor operating at a substantially constant speed, an intermittent switching means driven by said first motor and having a manually adjustable duty cycle, a second motor intermittently operated by said intermittent switching means, a first and a second double circuit switching means driven by said second motor, each of said double circuit switching means adapted to alternately energize two circuits in sequence, a first and a second bidirectional motor controlled by said first and said second double circuit switching means respectively and also by said intermittent switching means to cause cyclic rotation of said bidirectional motors in a forward and in a reverse direction, and means acting upon said double circuit switching means to influence the resultant incremental rotations of said bidirectional motors with respect to one another.

5. A moving target generating device comprising a first motor operating at a substantially constant speed, an intermittent switching means driven by said first motor and having an adjustable duty cycle, a second motor intermittently operated by said intermittent switching means, a first and a second double circuit switching means driven by said second motor, each of said double circuit switching means adapted to cyclically energize two circuits in sequence and provided also with means to vary the period wherein one circuit is energized with respect to the other, a first and a second bidirectional motor controlled by said first and said second double circuit switching means respectively and also by said intermittent switching means to cause cyclic rotation of said bidirectional motors in a forward and in a reverse direction, and component solving means acting upon said double circuit switching means to cause the resultant incremental rotations of said bidirectional motors to constitute mutually normal vector motions.

6. A moving target generating device comprising a first motor operating at a substantially constant speed, an intermittent switching means driven by said first motor and having a manually adjustable duty cycle, a second motor operated by said intermittent switching means causing the integrated speed of said second motor to represent a quantity proportional to the speed of the moving target, a first and a second double circuit switching means driven by said second motor, each of said double circuit switching means adapted to cyclically energize two circuits in sequence, each of said circuit switching means including a rotatable commutator with a plurality of brushes wherein at least one of said brushes is angularly adjustable about said commutator to vary the circular distance thereof with respect to the remaining brushes thereby causing an adjustable period wherein an electrical circuit is energized, a first and a second bidirectional motor controlled by said first and by said second double circuit switching means respectively and also by said intermittent switching means to effect intermittent cyclic rotation of said bidirectional motors in a forward and in a reverse direction thereby causing a resultant incremental rotation of each of said bidirectional motors, and adjustable component solving means acting upon said adjustable brushes of said double circuit switching means to cause said resultant incremental rotations to constitute the mutually normal vector motions of the course angle of said target as determined by said adjustable component solving means.

FORREST W. BROWN.

References Cited in the file of this patent

UNITED STATES PATENTS

| Number | Name | Date |
|---|---|---|
| 2,345,744 | Glenny | Apr. 4, 1944 |
| 2,531,400 | Clarkson, Jr. | Nov. 28, 1950 |
| 2,603,883 | Donahue | July 22, 1952 |